US000001384H

United States Statutory Invention Registration [19]

[11] Reg. Number: H1384

Sievert

[43] Published: Dec. 6, 1994

[54] CONTINUOUS BEARING

[75] Inventor: Steven A. Sievert, Ridgecrest, Calif.

[73] Assignee: The United States of America as represented by the Secretary of the Navy, Washington, D.C.

[21] Appl. No.: 903,628

[22] Filed: Aug. 28, 1986

[51] Int. Cl.[5] ..... F16C 29/06

[52] U.S. Cl. ..... 384/43; 244/3.1; 244/3.15; 244/129.1

[56] References Cited

U.S. PATENT DOCUMENTS

| | | | |
|---|---|---|---|
| 3,477,297 | 11/1969 | Howe | 74/5.1 |
| 3,527,435 | 9/1970 | Lapp et al. | 248/184 |
| 4,152,942 | 5/1979 | Anderson et al. | 74/5 R |
| 4,195,862 | 4/1980 | Specktor et al. | 280/661 |
| 4,212,098 | 7/1980 | Sand | 29/460 |
| 4,324,378 | 4/1982 | Groutage | 248/184 |
| 4,444,442 | 4/1984 | Hojo et al. | 308/2 A |
| 4,452,654 | 6/1984 | KaDell, Jr. | 156/91 |

*Primary Examiner*—Bernarr E. Gregory
*Attorney, Agent, or Firm*—W. Thom Skeer

[57] ABSTRACT

A outer bail gimbal bearing having a closed loop filled with circulating balls is disclosed. The balls circulate about an axis parallel to the bail's axis of rotation. A shallow region within the loop allows the balls to emerge from the loop and engage a race made in the outer edge of the outer bail.

4 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONTINUOUS BEARING

BACKGROUND OF THE INVENTION

1. Field of the Invention

The invention pertains generally to the field of missiles. In greater particularity of invention pertains to missile guidance and tracking sensor systems. In still greater particularity, the invention pertains to the sensor platforms for the above systems. In yet greater particularity, the invention pertains to gimbal sensor platforms. By way of further characterization, the invention relates to the bail bearings of gimbal supported sensors of missile sensor platforms.

2. Description of the Prior Art

A purpose of a missile sensor platform is to allow the missile sensor to have limited independent movement within the confines of the missile body. This independent movement allows the sensor to focus upon a target and relay information to the missile guidance system as to the relative position of the target with respect to the missile. By mounting the sensor within orthogonally arranged inner and outer bails, isolation of the sensor from the relative movement of the missile can be obtained. The achievement of accurate sensor information using this method is highly dependent upon the precise alignment and movement of the bails relative to their missile base. Complicating this goal are the severe vibrations and loadings the sensor system must endure not only while under operation, but also while being ferried by its delivering platform. Further, weight and size limitations demand proper respect.

Numerous designs for maintaining precision bail alignment and movement have been developed. They have all, however, enjoyed only a limited success. Current methods of aligning the outer bail involve the use of bearing races made a part of the outer edges of the bail itself. A common scheme is to allow the outer bail to ride upon rollers. The rollers mate with a soft metal bearing race cut into the bail's edges. Because of weight and dimensional constraints, a few rollers of relatively large size are utilized. The effect of this design is a concentration of vibrational and other loadings over a small segment of the bail. Another tried method has been to cut a recirculating bearing path into the platform base, thereby allowing circulating ball bearings to contact hardened steel bearing races inserted into the outer edge of the bail. A current example of this design has balls circulating about an axis perpendicular to the outer bails's axis of rotation. Dimensional limitations require the balls to negotiate tight corners, the result of which lessens the smoothness of the bail movement.

SUMMARY OF THE INVENTION

The present invention provides a continuous-recirculating ball bearing device to support an outer bail of a gimbal supported sensor of a missile sensor platform. Though the device is used in opposing pairs, only a single device will be hereafter discussed and the reader may assume that what applies to one device applies equally to the other. The bearing device is fixed to the base of the sensor platforms so that balls may emerge from the device and thereby make contact with a race on the outside edge of the outer bail. Configuration and placement of the device allows the balls to circulate in a wide loop, the axis of which is parallel to the axis of outer bail rotation. The balls travel freely in a ball return section that makes up most of the loop. This section can be fabricated of, for example, soft, easily machinable, lubricant impregnated material because insignificant forces are exerted upon it by the circulating bearings. A race insert section serves to complete the loop. The insert section opposes the bail race for only a small fraction or segment of the race. The insert, therefor described as being segmentally opposite the bail race, has a shallow region that allows balls to emerge from the loop and engage the bail race in load-bearing fashion. A transition plate encloses the balls in the loop except where the shallow region of the insert section ushers the balls into engagement with the bail race. The combination of transition plate and insert section shallow region allows a relatively large bearing loop of axis parallel to the outer bail's axis of rotation, to be fitted within the often tight dimensions of a missile sensor section. By utilizing a large loop, smoothness of operation can be achieved. Furthermore, the use of a multitude of balls inserted into races allows large torque and vibrational loadings to be held in check and closeness of tolerances to be maintained.

OBJECTS OF THE INVENTION

The primary object of this invention is to provide a bearing suitable for gimbal applications.

Another object of the invention is to provide a bail bearing for a gimbal supported missile sensor that can withstand high loads and intense vibrations while at the same time maintain both smooth and precise operation.

DESCRIPTION OF THE PREFERRED EMBODIMENT

Figure 1:
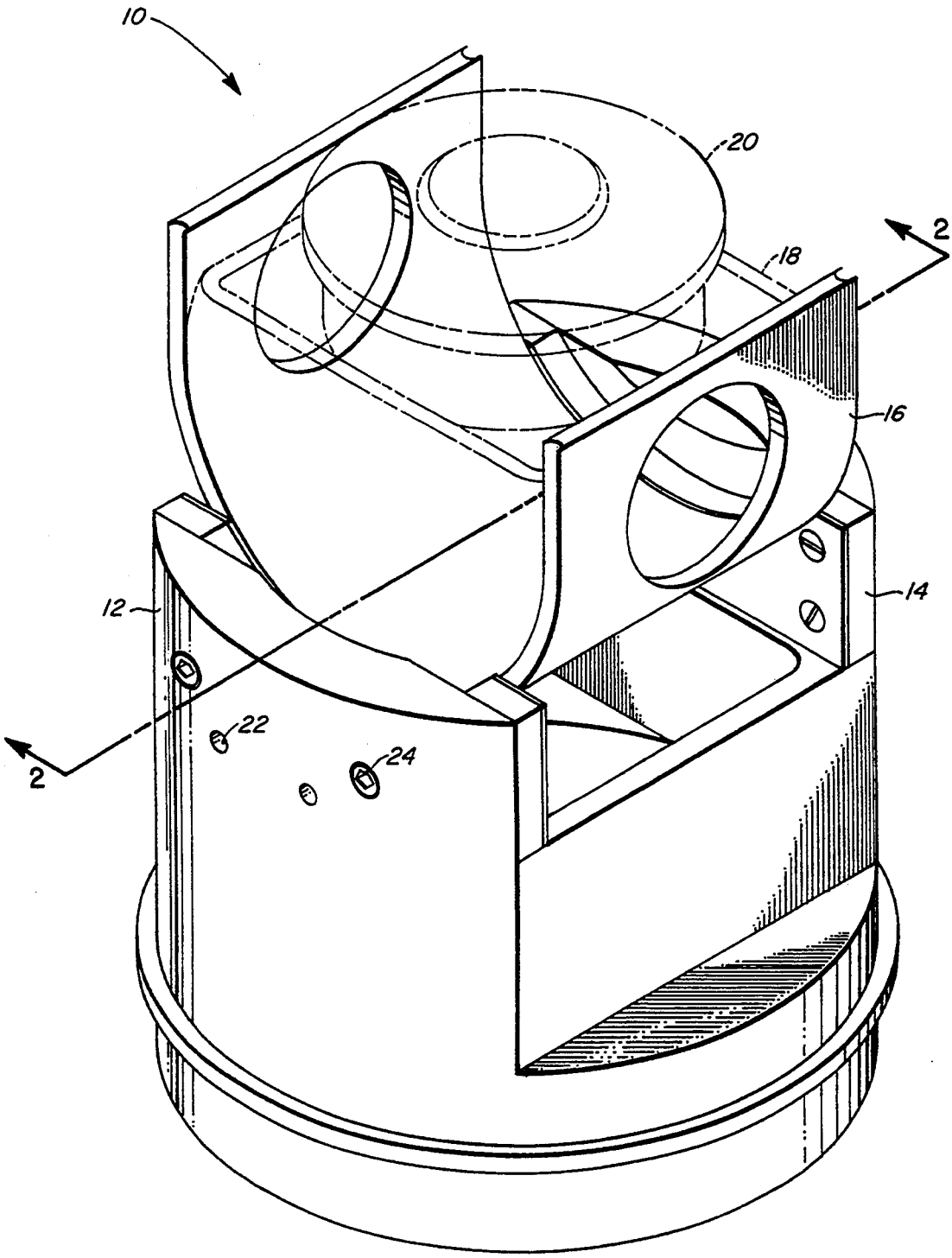
FIG. 1 is a perspective view of the gimbal sensor platform embodying the present invention.

Referring to FIG. 1, a perspective view of a representative missile sensor platform with a gimbal supported sensor is useful in discussing the specific construction of the inventive arrangement. As shown, a missile platform 10 is comprised of a base 12 that serves as a mount for the inner and outer bails of the platform. Secured to base 12 by a continuous bearing assembly 14 to be described, is the outer bail 16. Pivotally attached to outer bail 16, is the inner bail 18, that cradles the sensor 20.

Figure 2:
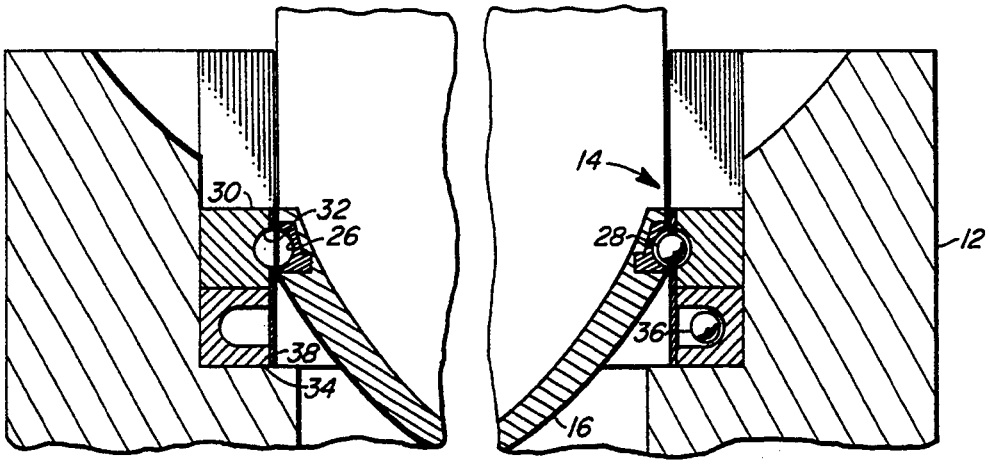
FIG. 2 is a cross-sectional view taken along lines II—II of FIG. 1 illustrating the bearing interfaces.
Figure 4:
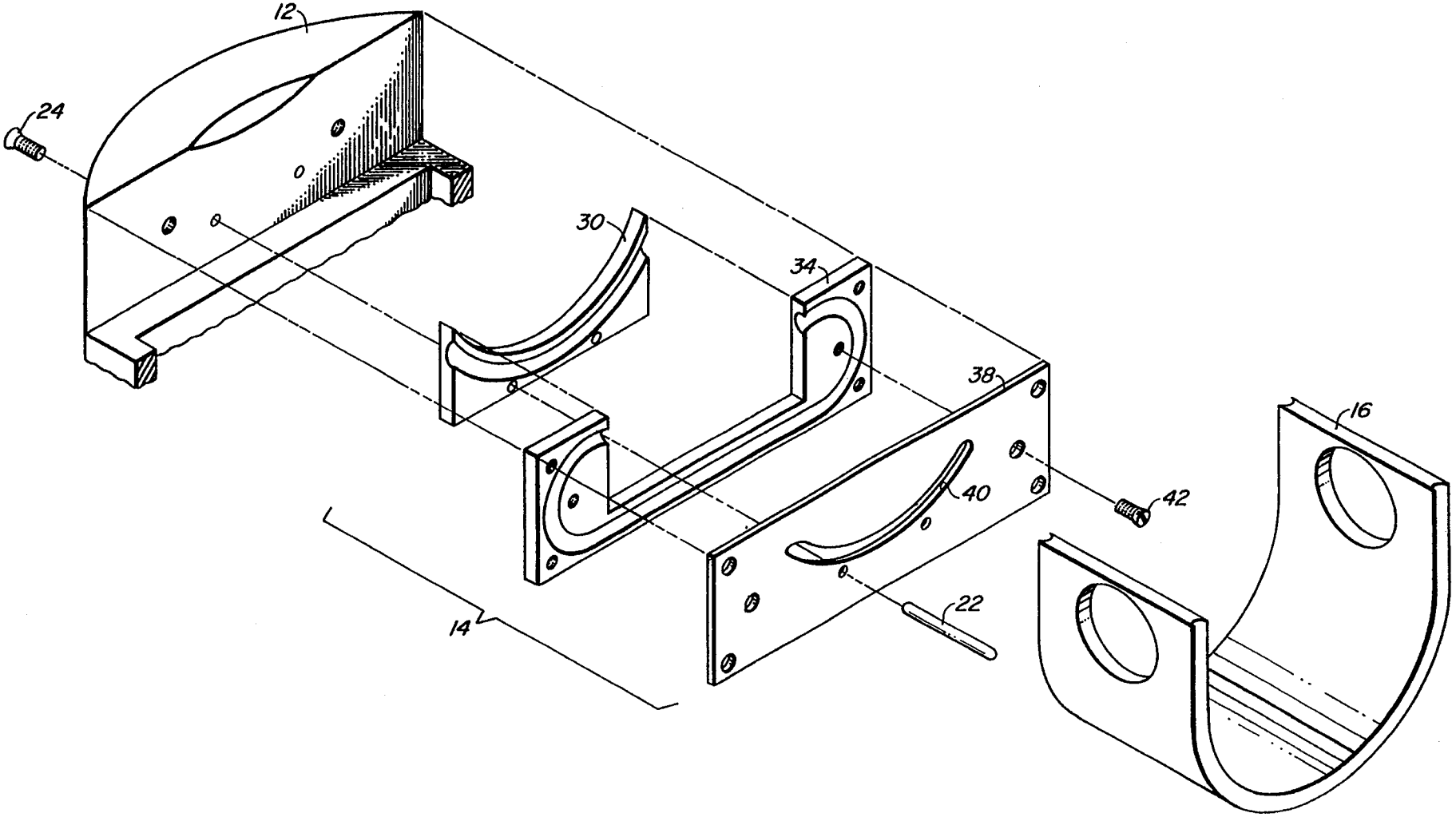
FIG. 4 is an assembly perspective view of the continuous bearing.

Referring to FIG. 2, there is illustrated in cross-section the bearing interfaces between the outer bail 16 and base 12. It is seen that outer bail 16 has secured to it a first arcuate ball race 26. First ball race 26 may be secured to bail 16 by glueing or any other suitable attachment means. Opposite first ball race 26 is a second arcuate ball race 30 of bearing assembly 14. Second ball race 30 has a shallow region 32. A first plurality of balls 28 are received in load-bearing engagement between first ball race 26 and shallow region 32 of second ball race 30. A ball return 34 is combined with second ball race 30 so as to form a closed ball loop to be described in greater detail below. Ball return 34 is filled with a second plurality of balls 36. The combination of first balls 28 with second balls 36 form a continuous chain of balls within the loop. A transition plate 38 covers the loop and retains second balls 36 within ball return 34; however, a slot 40 as best seen in FIG. 4, is provided in the plate to allow first balls 28 to emerge from second ball race 30 and engage first ball race 26. Under operating conditions, the chain of balls comprising first balls 28 and second balls 36 circulate around the loop.

Ball return 34 may be fabricated of any suitable material. In practice a lubricant impregnated material such as Micarta was used, however, a variety of metals and plastics can do.

Figure 3:
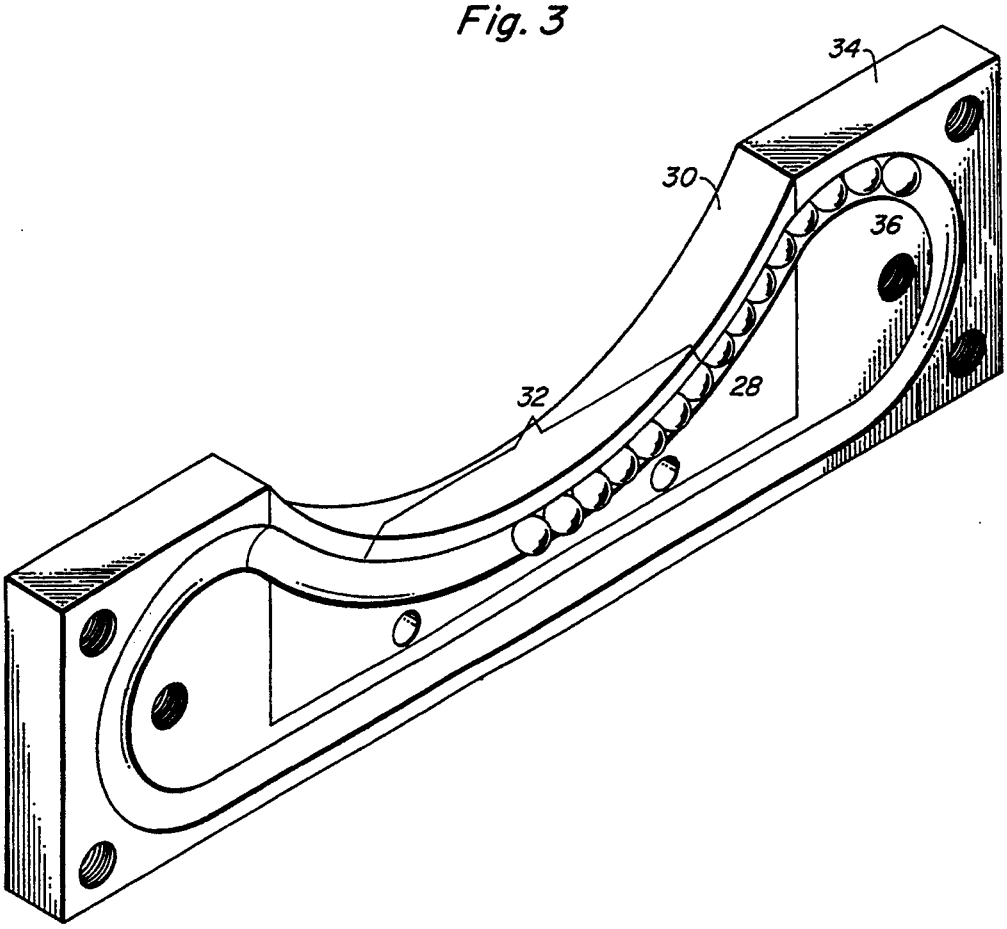
FIG. 3 is a perspective view of the ball loop with the transition plate removed.

Referring to FIG. 3, there is illustrated a perspective view of the ball loop with transition plate removed. The ball loop can be seen to be comprised of second ball race 30 and ball return 34. Second balls 36 are completely received within ball return 34. Shallow region 32 of second ball race 30 ushers first balls 28 to emerged from the loop and engage outer bail 16 as illustrated in FIG. 2.

Referring to FIG. 4, an assembly perspective view of the continuous bearing device is presented. Second ball race 30 is secured to ball return 34 by glueing or any other suitable attachment means. Transition plate 38 having slot 40 is secured to both second ball race 30 and ball return 34 by any suitable means such as threaded machine screws 42. The ball loop is next loaded with first balls 28 and second balls 36, FIG. 3. Second ball race 30 and bail 16 are aligned. Bearing assembly 14 is secured to base 12 by suitable attachment means such as the pins 22 and the cap screws 24.

It is thus seen that a continuous bearing for a gimbal supported sensor of a missile sensor platform has been disclosed in which balls circulate about an axis parallel to the outer bail's axis of rotation. Precision movement is maintained by this arrangement. Precision tolerances are maintained by allowing outer bail 16 to ride on balls mated between race 26 of bail 16 and shallow region 32 of assembly 14's race 30.

Obviously, many modifications and variations of this invention are possible, and it is therefor understood that within the scope of the inventive concept disclosed, the invention may be practiced otherwise than as specifically described.

What is claimed is:

1. A recirculating bearing apparatus comprising:

a first arcuate ball race;

a second arcuate ball race segmentally opposite of said first ball race, of the same radius as, and rotatably concentric to, said first ball race, having a shallow region located between the ends of said second ball race;

a first plurality of balls disposed in load-bearing engagement between said first ball race and said shallow region of said second ball race;

a second plurality of balls;

a ball return connected to said second ball race such that said ball return and said second ball race meet to define a closed loop, so that said first and second pluralities of balls are received within said closed loop so as to circulate around said closed loop;

a transition plate enclosing said ball return and said second ball race, said transition plate having a slot over said shallow region of said second ball race so that said first plurality of balls protrude through said transition plate slot and thereby engage engage said first ball race.

2. A recirculating bearing apparatus according to claim 1 wherein said ball return is made of lubricant impregnated material.

3. A recirculating bearing apparatus for supporting a bail of a gimbal sensor platform comprising:

a first arcuate ball race adapted to be connected with said bail of said gimbal platform;

a second arcuate ball race segmentally opposite of said first ball race, of the same radius as, and rotatably concentric to, said first ball race, having a shallow region located between the ends of said second ball race;

a first plurality of balls disposed in load-bearing engagement between said first ball race and said shallow region of said second ball race;

a second plurality of balls;

a ball return connected to said second ball race such that said ball return and said second ball race meet to define a closed loop, so that said first and second pluralities of balls are received within said closed loop so as to circulate around said closed loop; a transition plate enclosing said ball return and said second ball race, said transition plate having a slot over said shallow region of said second ball race so that said first plurality of balls protrude through said transition plate slot and thereby engage said first ball race;

means for securing said second ball race, ball return and transition plate together;

means for mounting said second ball race, ball return and transition plate on said platform in an operative position relative to said first ball race.

4. A recirculating bearing apparatus according to claim 3 wherein said ball return is made of lubricant impregnated material.

* * * * *